United States Patent
Peng

(10) Patent No.: US 8,264,836 B2
(45) Date of Patent: Sep. 11, 2012

(54) BATTERY COVER LATCHING MECHANISM AND ELECTRONIC DEVICE USING THE SAME

(75) Inventor: Liang-Tian Peng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 267 days.

(21) Appl. No.: 12/868,828

(22) Filed: Aug. 26, 2010

(65) Prior Publication Data

US 2011/0279947 A1  Nov. 17, 2011

(30) Foreign Application Priority Data

May 13, 2010 (CN) .......................... 2010 1 0171155

(51) Int. Cl.
*H05K 5/02* (2006.01)
*H01M 2/10* (2006.01)

(52) U.S. Cl. .............. 361/679.56; 361/679.01; 292/175; 292/207; 292/228; 429/98; 429/100

(58) Field of Classification Search ............. 361/679.01, 361/679.56; 292/1, 175, 202, 207, 219, 228, 292/DIG. 10, DIG. 11, DIG. 37, DIG. 57, 292/DIG. 63; 429/97, 98, 100
See application file for complete search history.

(56) References Cited

U.S. PATENT DOCUMENTS 8,199,496 B2 * 6/2012 Liu et al. .................. 361/679.58
* cited by examiner

*Primary Examiner* — Robert J Hoffberg
(74) *Attorney, Agent, or Firm* — Altis Law Group, Inc.

(57) ABSTRACT

An exemplary battery cover latching mechanism for latching a battery cover to a rear cover, includes a rod, a suction cup, an elastic element and a sliding key. The rod has a first end and a second end, is hinged to the rear cover, and includes a first positioning slot and a second positioning slot. The suction cup is mounted at the first end of the rod. The elastic element is mounted on the second end of the rod and resisting the rear cover. The sliding key is slidably mounted to the rear cover. When the sliding key latches with the first positioning slot, the suction cup sucks the battery cover to the rear cover; when the sliding key slides out of the first positioning slot to the second positioning slot, the rod rotates relative to the rear cover to release the battery cover.

10 Claims, 8 Drawing Sheets

BATTERY COVER LATCHING MECHANISM AND ELECTRONIC DEVICE USING THE SAME

BACKGROUND

1. Technical Field

The disclosure generally relates to battery cover latching mechanisms, and particularly relates to battery cover latching mechanisms used in electronic devices.

2. Description of Related Art

Batteries are widely used in electronic devices, such as personal digital assistants (PDAs), cellular phones, etc. Typically, a latching structure is used to latch a battery cover to the electronic device and thus to secure the battery (or batteries) between the battery cover and the electronic device. However, a typical latching structure may be hard to unlatch when the battery needs to be removed.

Therefore, there is a room for improvement within the art.

BRIEF DESCRIPTION OF THE DRAWINGS

Many aspects of the exemplary battery cover latching structure can be better understood with reference to the following drawings. These drawings are not necessarily drawn to scale, the emphasis instead being placed upon clearly illustrating the principles of the exemplary battery cover latching structure and electronic device. Moreover, in the drawings, like reference numerals designate corresponding parts throughout the several views. Wherever possible, the same reference numerals are used throughout the drawings to refer to the same or like elements of an embodiment.

DETAILED DESCRIPTION

For illustrative purposes, a portable device employing a battery cover latching mechanism is an electronic device such as a wireless communication device. The wireless communication device is for example a radiotelephone. The radiotelephone described herein is a representation of the type of wireless communication device that may benefit from the present disclosure. However, it is to be understood that the present disclosure may be applied to any type of handheld or portable device including, but not limited to, the following devices: cordless phones, paging devices, personal digital assistants, portable computers, pen-based or keyboard-based handheld devices, remote control units, portable media players that have wireless communication capability, and the like. Accordingly, any reference herein to the radiotelephone should also be considered to apply equally to other portable wireless electronic devices.

Figure 1:
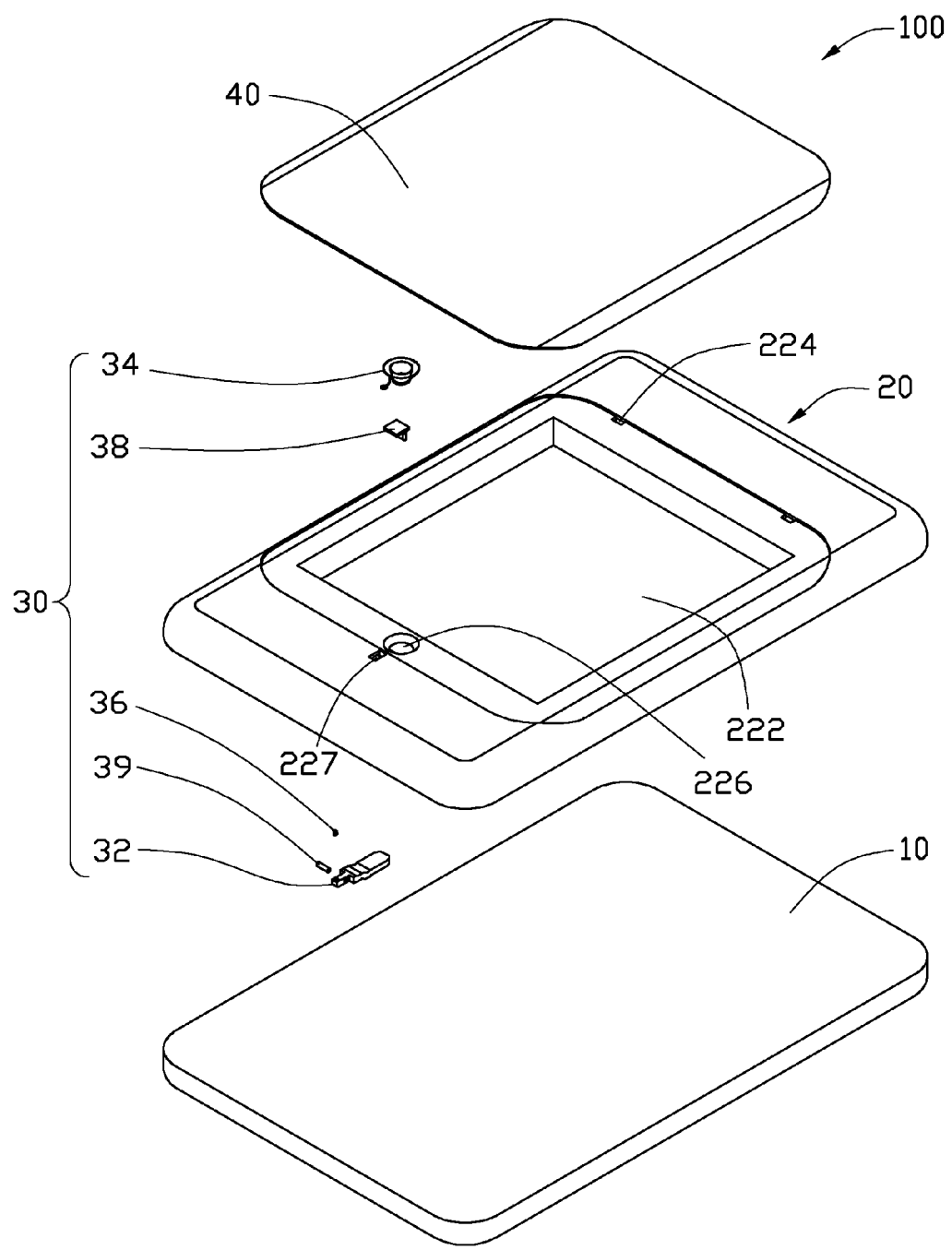
FIG. 1 is a schematic, exploded, isometric view of an electronic device with a battery cover latching mechanism according to an exemplary embodiment.
Figure 7:
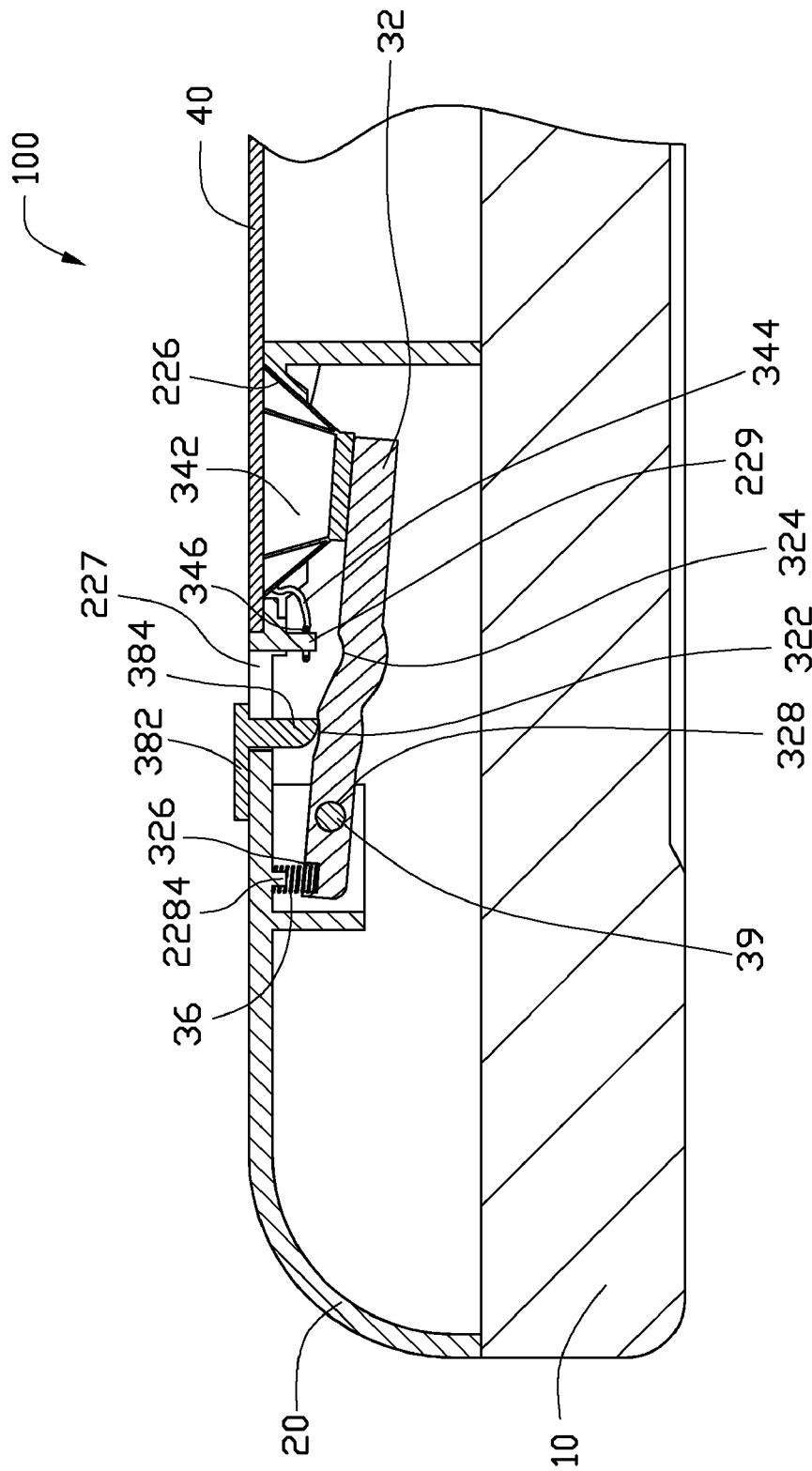
FIG. 7 is an enlarged, cross-sectional view of the electronic device shown in FIG. 6, taken along a line VII-VII thereof.

Referring to FIGS. 1 and 7, the electronic device 100 includes a front cover 10, a rear cover 20, a battery cover latching mechanism 30, and a battery cover 40. The rear cover 20 is mounted to the front cover 10, and the battery cover latching mechanism 30 is mounted to the rear cover 20. The battery cover 40 is releasably latched on the rear cover 20 by the battery cover latching mechanism 30.

Figure 3:
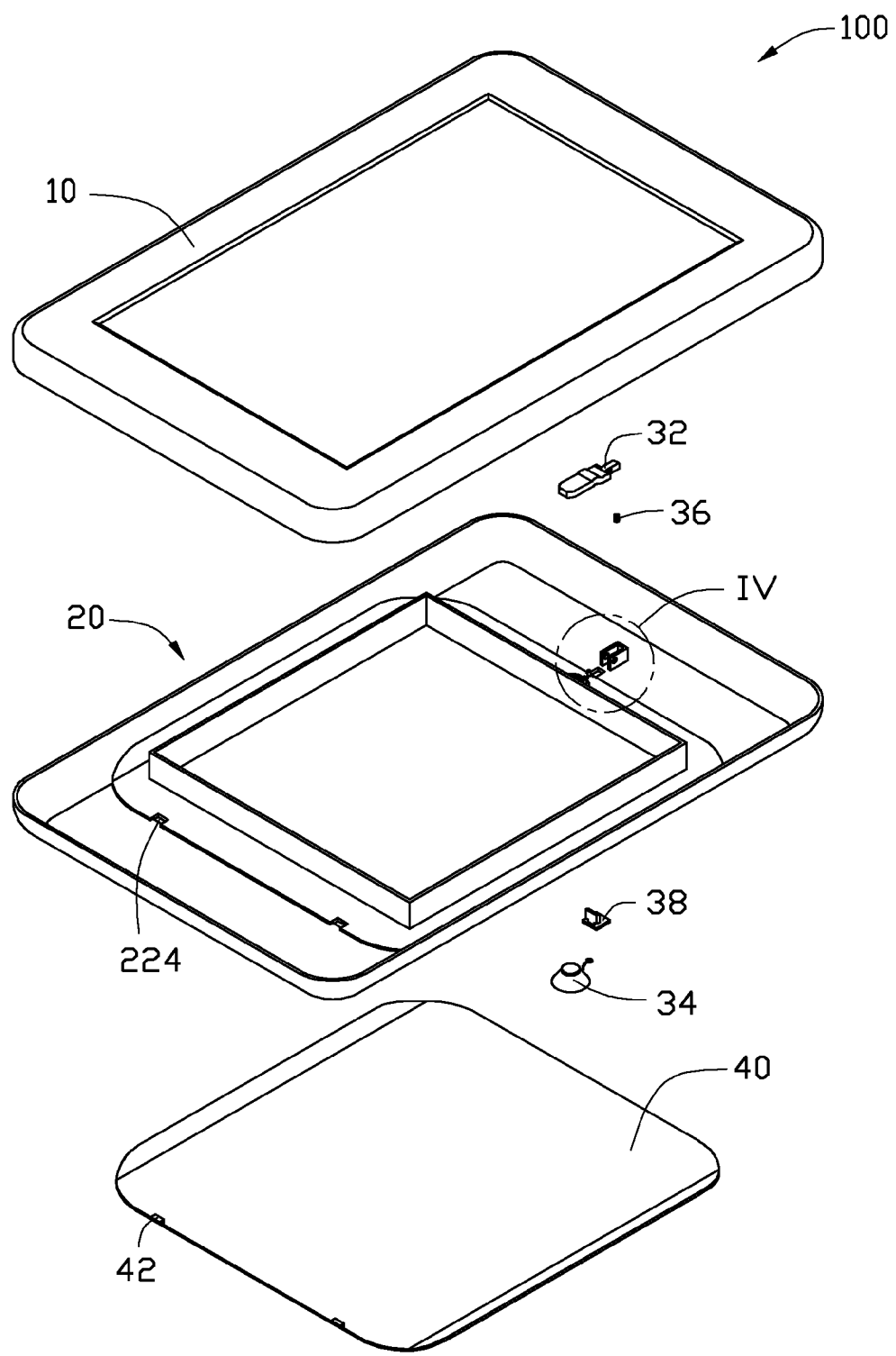
FIG. 3 is similar to FIG. 1, but showing the electronic device in another aspect.
Figure 4:
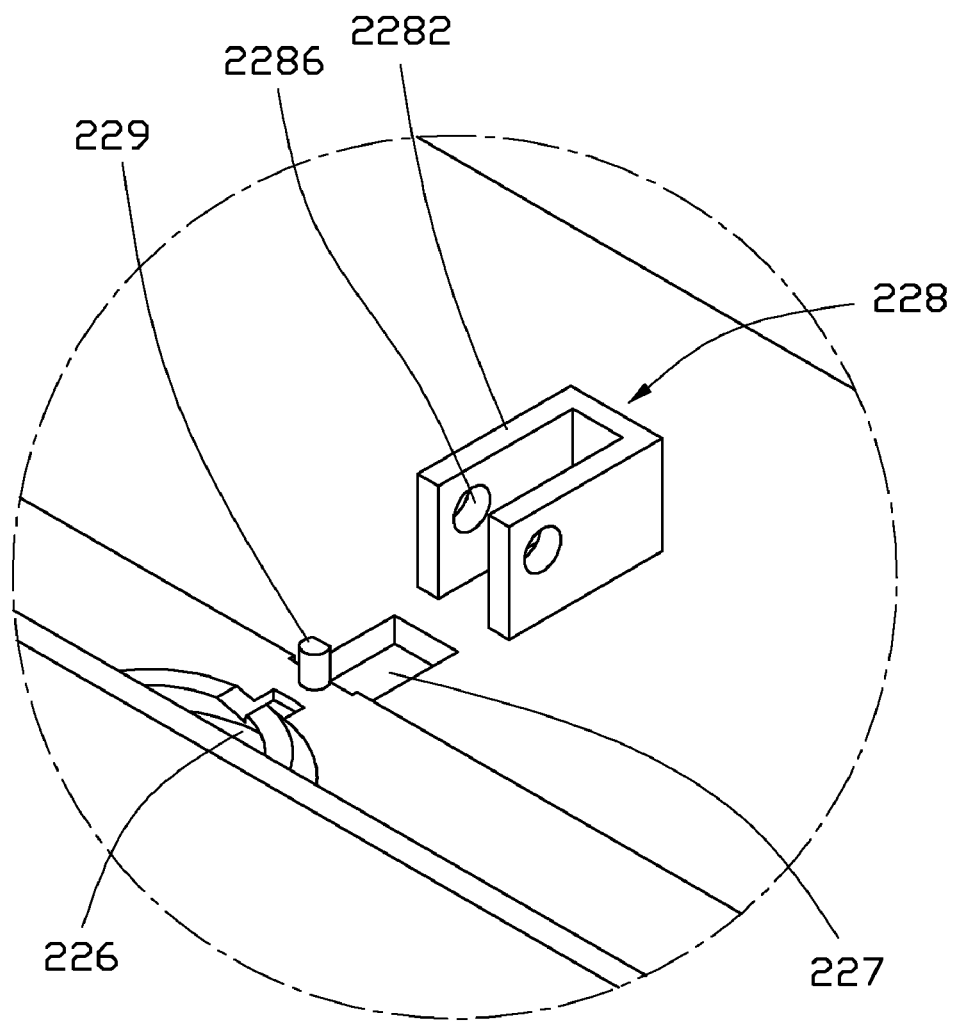
FIG. 4 is an enlarged view of a circled portion IV of the electronic device shown in FIG. 3.

Referring to FIGS. 1 and 3-4, the rear cover 20 defines a compartment 222 for accommodating a battery (not shown). The rear cover 20 further defines two latching holes 224 located near one side of the compartment 222, and an opening 226 and a sliding groove 227 located near another side of the compartment 222. The latching holes 224 are for latching the battery cover 40 to the rear cover 20. The rear cover 20 further includes a mounting portion 228 and a post 229 protruding from an inner surface thereof. The mounting portion 228, in this exemplary embodiment, includes two opposite plates 2282 and a block 2284 located between the plates 2282. Each plate 2282 defines a retaining hole 2286 therethrough.

Figure 2:
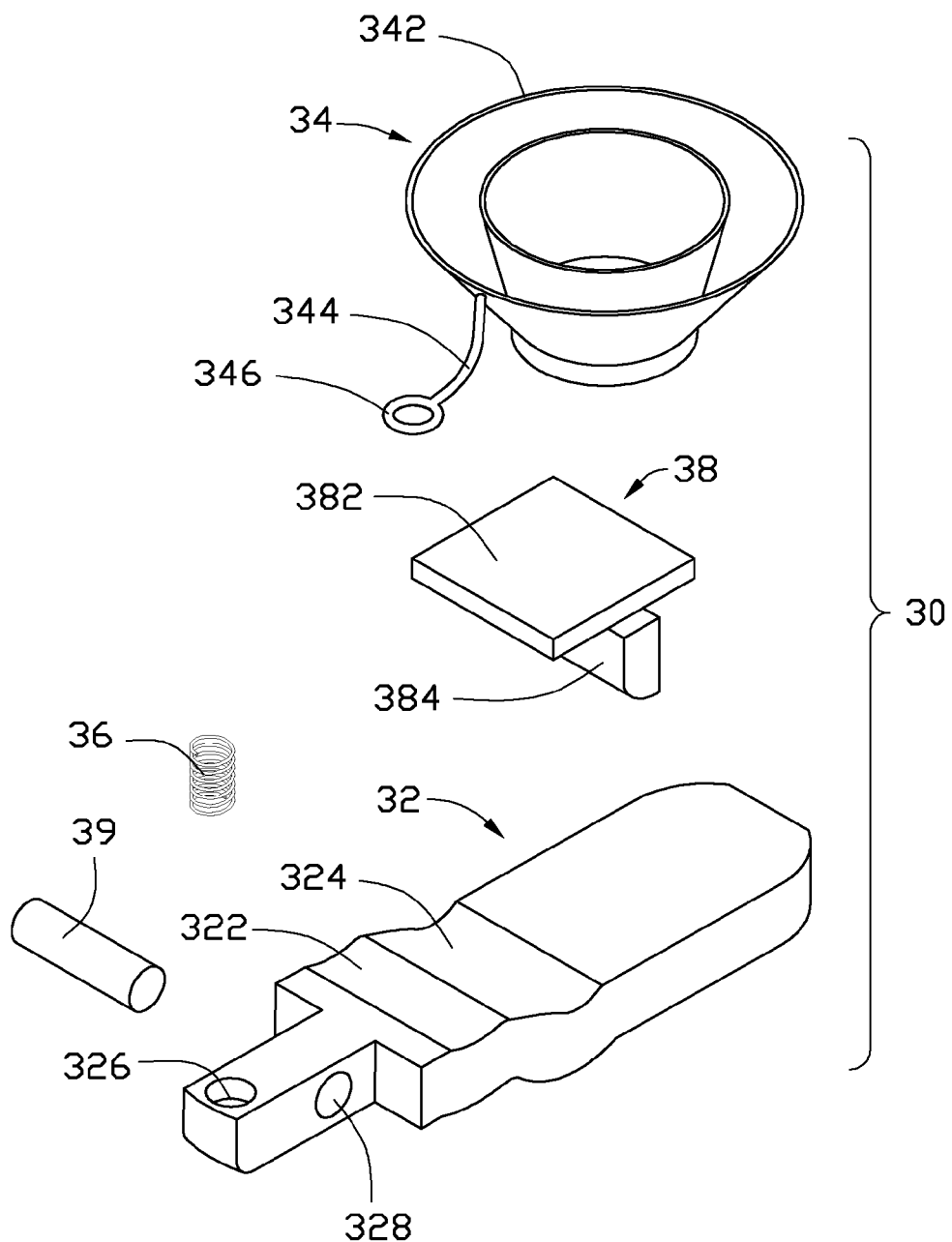
FIG. 2 is an enlarged view of the battery cover latching mechanism shown in FIG. 1.

Referring to FIGS. 2 and 7, the battery cover latching mechanism 30 includes a rod 32, a suction cup 34 positioned near a first end of the rod 32, an elastic element 36 positioned near a second end of the rod 32, a sliding key 38, and a shaft 39. The rod 32 defines a first positioning slot 322, and a second positioning slot 324 spaced from the first positioning slot 322. In the illustrated embodiment, the first and second positioning slots 322, 324 are separated from each other by a ramp portion of the rod 32. The first positioning slot 322 and the second positioning slot 324 respectively engage with the sliding key 38 so that the rod 32 is positioned in different positions like those shown in FIGS. 7 and 8. The rod 32 further defines a recess 326 near the second end thereof for accommodating the elastic element 36, and an aperture 328 between the first end and the second end thereof for engaging with the shaft 39. The aperture 328 is aligned with the retaining holes 2286, and the shaft 39 is inserted in the aperture 328 and the retaining holes 2286 so that the rod 32 is hinged to the rear cover 20. The suction cup 34 includes a main body 342, a flexible tie 344 protruding from an outer surface of the main body 342, and a retaining ring 346 formed at a distal end of the flexible tie 344. The retaining ring 346 is wrapped around the post 229 so that the flexible tie 344 is fixed to the rear cover 20. Thereby, the flexible tie 344 is coupled between the rear cover 20 and the main body 342. The elastic element 36 is located between the rear cover 20 and the rod 32, to exert force on the rod 32 when the battery cover 40 is to be released. In this exemplary embodiment, the elastic element 36 is a compressed spring, with one end of the elastic element 36 wrapped around the block 2284, and another end of the elastic element 36 received in the recess 326.

Figure 5:
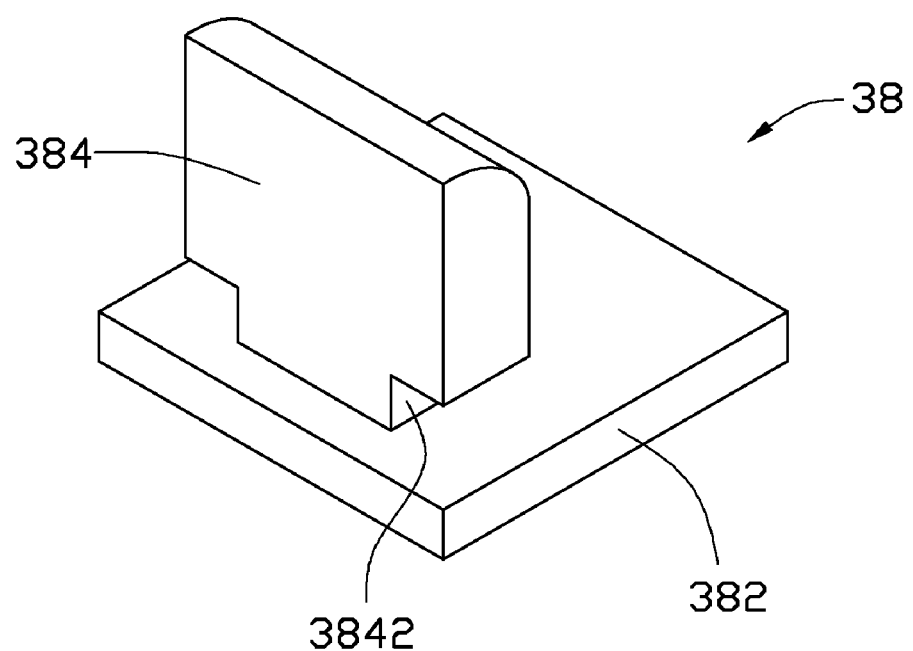
FIG. 5 is an enlarged view of a sliding key shown in FIG. 3, showing the sliding key in another aspect.
Figure 6:
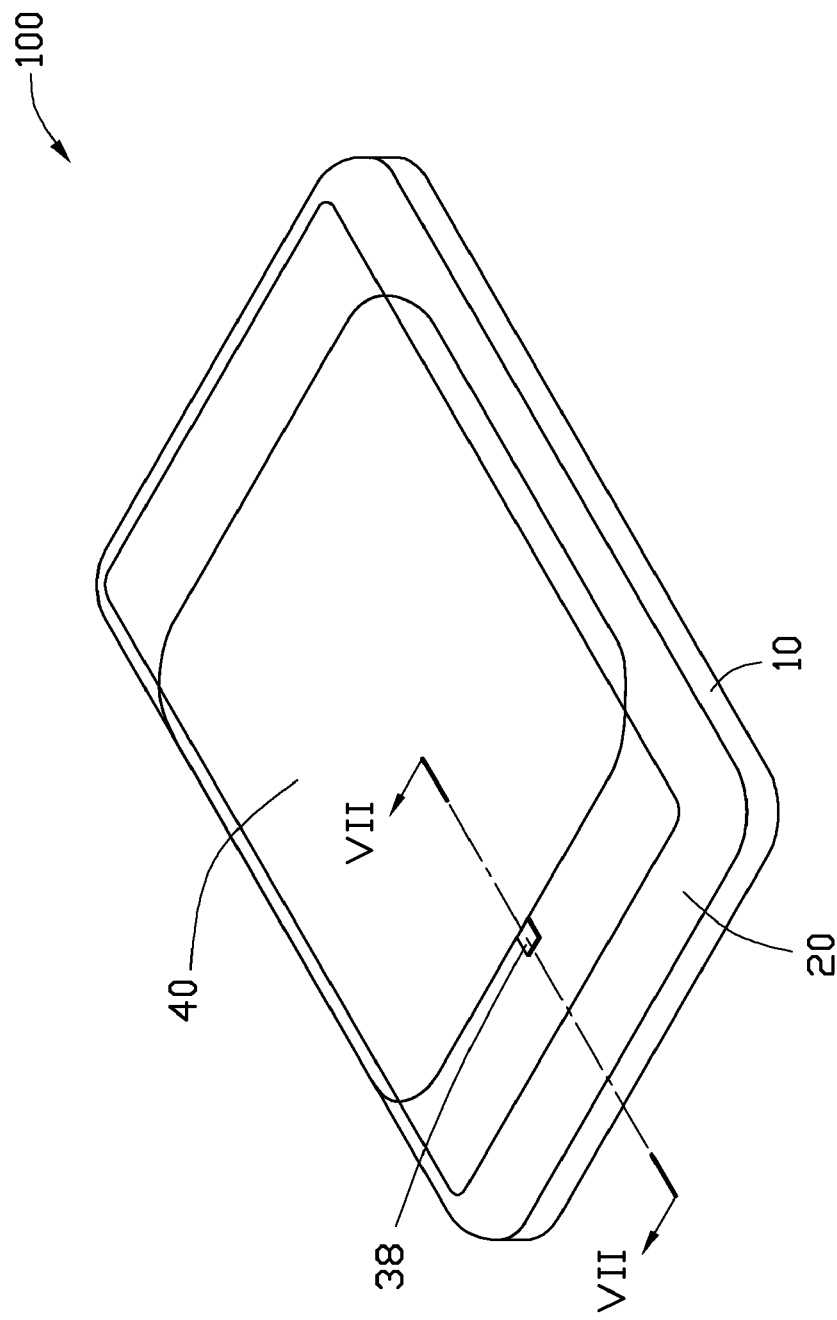
FIG. 6 is an assembled view of the electronic device shown in FIG. 1.

Referring to FIGS. 5 and 7, the sliding key 38 includes an operating portion 382, and a resisting portion 384 protruding from the operating portion 382. The resisting portion 384 is for resisting the rod 32. The resisting portion 384 defines two opposite retaining slots 3842. The retaining slots 3842 are located between the resisting portion 384 and the operating portion 382, and are used for slidably mounting the sliding key 38 to the rear cover 20.

Referring to FIGS. 1 and 3, the battery cover 40 has two spaced latches 42 protruding therefrom. Each latch 42 latches in one of the latching holes 224 to latch the battery cover 40 to the rear cover 20.

Referring to FIGS. 1, 4 and 7, in assembly, the suction cup 34 is mounted (e.g., adhered) to the rod 32. The elastic element 36 is wrapped on the block 2284. The second end of rod 32 is moved into the mounting portion 228 until the aperture 328 is aligned with the retaining holes 2286, the suction cup 34 is aligned with the opening 226, and the elastic element 36 is received in the recess 326. The shaft 39 is inserted in the retaining holes 2286 and the aperture 328 so that the rod 32 is hinged to the rear cover 20. The sliding key 38 is slidably mounted to the rear cover 20 and latched in the first positioning slot 322. The retaining ring 346 is wrapped around the post 229 so that the flexible tie 344 is positioned between the main body 342 and the rear cover 20. The rear cover 20 is mounted to the front cover 10. The latches 42 are latched in the latching holes 224. Then the battery cover 40 is pushed onto the rear cover 20 until the battery cover 40 is attached on the main body 342 of the suction cup 34, so that the battery cover 40 is attached to the rear cover 20 by suction of the suction cup 34. Thus, the suction engagement of the suction cup 34 and the battery cover 40, and the latching engagement of the latches 42 in the latching holes 224, cooperatively latch the battery cover 40 to the rear cover 20.

Figure 8:
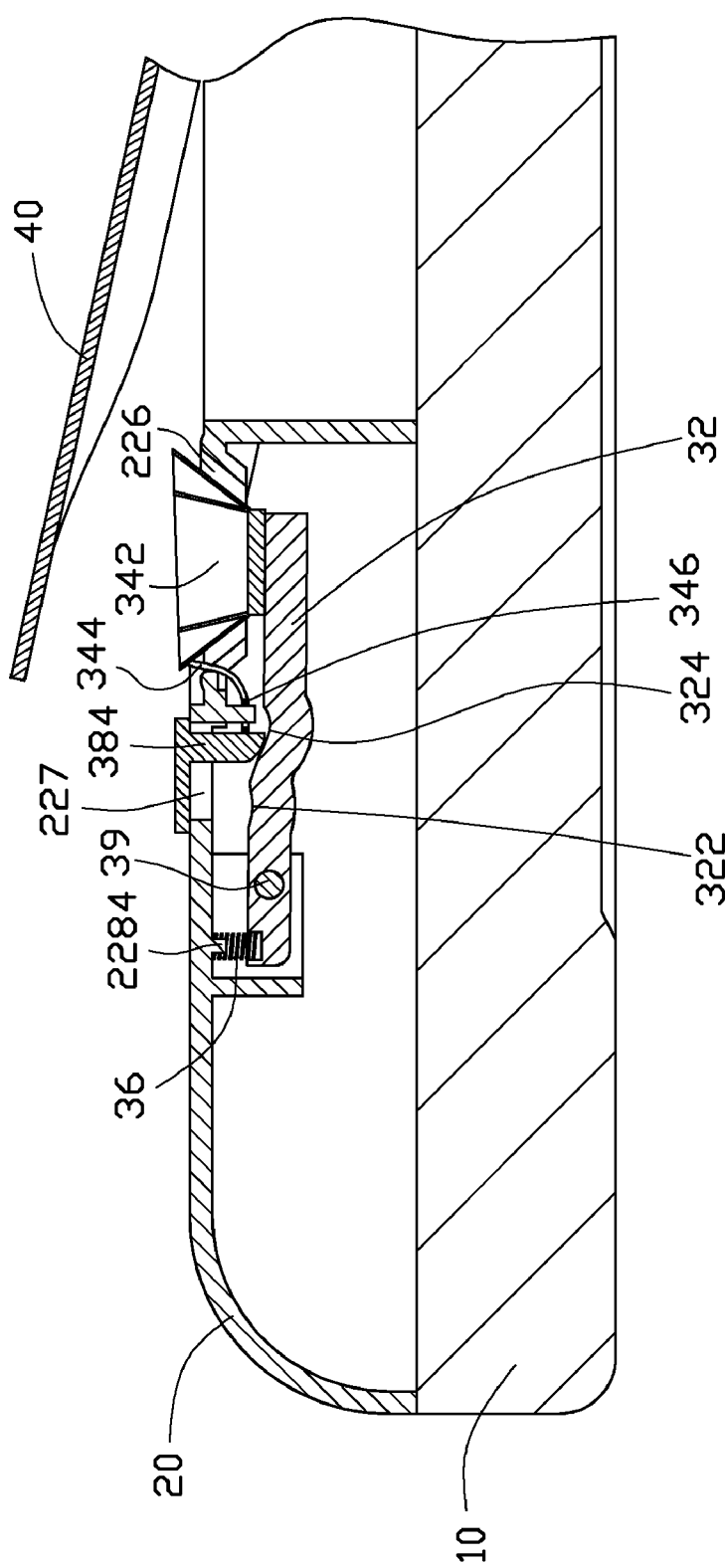
FIG. 8 is similar to the FIG. 7, but showing a battery cover released from a rear cover.

Referring to FIGS. 7-8, to release the battery cover 40 from the rear cover 20, the sliding key 38 is slid out of the first positioning slot 322 to the second positioning slot 324 by a user, so that the rod 32 rotates about the shaft 39 to make the suction cup 34 move up and away from the rear cover 20. As the suction cup 34 moves away from the rear cover 20, the flexible tie 344 pulls the suction cup 34 until the suction cup 34 is separated from the battery cover 40. Thus, the suction engagement of the suction cup 34 and the battery cover 40 is released. That is, the battery cover 40 is released from the rear cover 20, as shown in FIG. 8.

It is to be understood, however, that even through numerous characteristics and advantages of the exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latching mechanism for latching a battery cover to a rear cover, the battery cover latching mechanism comprising:
   a rod;
   a shaft, the rod pivotably engaged on the shaft such that the rod is capable of rotating relative to the rear cover, the rod having a first positioning portion and a second positioning portion formed at one surface thereof;
   a suction cup mounted on the rod and spaced apart from the shaft, the suction cup configured to engage with the battery cover by suction;
   an elastic element engaged with the rod, the elastic element spaced apart from the suction cup; and
   a sliding key configured to be slidably mounted to the rear cover and selectively engaged with and resisting the first positioning portion or the second positioning portion;
   wherein the elastic element is compressible between the rod and the rear cover such that when the sliding key is slid from the first positioning portion to the second positioning portion, the elastic element is capable of decompressing and driving the rod to rotate relative to the rear cover and push the suction cup to release the suction between the suction cup and the battery cover.

2. The battery cover latching mechanism of claim 1, wherein the rod has a first end and an opposite second end, the suction cup is mounted on the first end, and the elastic element is engaged with the second end.

3. The battery cover latching mechanism of claim 1, wherein each of the first positioning portion and the second positioning portion comprises a positioning slot defined in the rod, and the first and second positioning portions are spaced from each other.

4. The battery cover latching mechanism of claim 3, further comprising a flexible tie extending between the suction cup and the rear cover; wherein when the sliding key is slid out of the first positioning slot to the second positioning slot, the flexible tie pulls the suction cup to release the suction between the suction cup and the battery cover.

5. A battery cover latching mechanism for latching a battery cover to a rear cover, the battery cover latching mechanism comprising:
   a rod having a first end and a second end opposite to the first end, an intermediate portion of the rod capable of being hinged relative to the rear cover, the rod including a first positioning slot and a second positioning slot;
   a suction cup mounted at the first end of the rod for suction holding the battery cover on the rear cover;
   an elastic element mounted on the second end of the rod and compressible between the rod and the rear cover; and
   a sliding key configured to be slidably mounted to the rear cover;
   wherein when the sliding key is latched in the first positioning slot, the suction cup is capable of holding the battery cover on the rear cover by the suction holding; and when the sliding key is slid out from the first positioning slot to the second positioning slot, the elastic element is capable of decompressing and driving the second end of the rod to rotate away from the rear cover such that the first end of the rod rotates toward the battery cover and releases the suction holding of the suction cup.

6. The battery cover latching mechanism of claim 5, further comprising a flexible tie extending between the suction cup and the rear cover; wherein when the sliding key is slid out of the first positioning slot to the second positioning slot, the flexible tie pulls the suction cup to release the suction holding of the suction cup.

7. An electronic device comprising:
   a rear cover;
   a battery cover latchable to the rear cover;
   a rod having a first end and a second end opposite to the first end, an intermediate portion of the rod being hinged to the rear cover, the rod including a first positioning slot and a second positioning slot;
   a suction cup mounted at the first end of the rod for suction holding the battery cover on the rear cover;
   an elastic element mounted on the second end of the rod and compressible between the rod and the rear cover; and
   a sliding key slidably mounted to the rear cover;
   wherein when the sliding key is latched in the first positioning slot, the suction cup holds the battery cover on the rear cover by the suction holding; and when the sliding key is slid out from the first positioning slot to the second positioning slot, the elastic element decompresses and drives the second end of the rod to rotate away from the rear cover such that the first end of the rod rotates toward the battery cover and releases the suction cup from the battery cover.

8. The electronic device of claim 7, further comprising a flexible tie extending between the suction cup and the rear cover; wherein when the sliding key slides out of the first positioning slot to the second positioning slot, the flexible tie pulls the suction cup to release the suction cup from the battery cover.

9. The electronic device of claim 8, further comprising a shaft; wherein the rod defines an aperture between the first end and the second end, the rear cover defines two retaining holes therein aligned with the aperture, and the shaft is inserted in the aperture and the retaining holes to hinge the rod to the rear cover.

10. The electronic device of claim 9, wherein the first positioning slot and the second positioning slot are both defined between the aperture and the first end of the rod.

* * * * *